United States Patent [19]

Chapin et al.

[11] Patent Number: 5,267,109
[45] Date of Patent: Nov. 30, 1993

[54] AIR BEARING SLIDER WITH RELIEVED TRAILING EDGE

[75] Inventors: Robert E. Chapin, Burnsville; Peter Crane, Minneapolis, both of Minn.

[73] Assignee: Seagate Technology, Inc., Scotts Valley, Calif.

[21] Appl. No.: 980,647

[22] Filed: Nov. 24, 1992

Related U.S. Application Data

[63] Continuation of Ser. No. 715,792, Jun. 14, 1991, Pat. No. 5,182,689.

[51] Int. Cl.$^5$ .............................................. G11B 5/60
[52] U.S. Cl. .................................................. 360/103
[58] Field of Search ........................................ 360/103

[56] References Cited

U.S. PATENT DOCUMENTS

| 3,197,751 | 7/1965 | Felts | 340/174.1 |
|---|---|---|---|
| 3,573,768 | 4/1971 | Harris | 340/174.1 |
| 3,855,625 | 12/1974 | Garnier et al. | 360/103 |
| 4,218,715 | 8/1980 | Garnier | 360/103 |
| 4,420,780 | 12/1983 | Deckert | 360/103 |
| 4,533,184 | 11/1985 | Ogishima | 360/103 |
| 4,555,739 | 11/1985 | Le Van et al. | 360/103 |
| 4,636,894 | 1/1987 | Mo | 360/103 |
| 4,644,641 | 2/1987 | Verdone | 29/603 |
| 4,646,180 | 2/1987 | Ohtsubo | 360/103 |
| 4,734,803 | 3/1988 | Nishihira | 360/103 |
| 4,802,042 | 1/1989 | Strom | 360/103 |
| 4,870,519 | 9/1989 | White | 360/103 |
| 4,870,521 | 9/1989 | Okabayashi | 360/103 |
| 4,893,204 | 1/1990 | Yamada et al. | 360/103 |
| 4,894,740 | 1/1990 | Chhabra et al. | 360/103 |

FOREIGN PATENT DOCUMENTS

| 62-110680 | 5/1987 | Japan . |
|---|---|---|
| 63-231775 | 9/1988 | Japan . |
| 1-211383A | 8/1989 | Japan . |
| 2-132688 | 5/1990 | Japan . |
| 0387444 | of 1909 | United Kingdom . |

OTHER PUBLICATIONS

Research Disclosure, Roll Intensive Slider Design for Improved Disk File Reliability, Nov. 1985, p. 596.

Primary Examiner—A. J. Heinz
Attorney, Agent, or Firm—Kinney & Lange

[57] ABSTRACT

A slider supports a transducer proximate a rotating disc. The slider includes a slider body having a leading edge, a trailing edge and first and second edges. First and second raised side rails are positioned along the first and second edges, respectively, to form a pair of air bearing surfaces. The first and second side rails each includes a trailing edge relief positioned adjacent the trailing edge. The trailing edge reliefs are recessed from the air bearing surfaces and are raised from the slider body. The trailing edge reliefs have depths which are suitable for forming subambient pressure regions at the trailing edge.

10 Claims, 8 Drawing Sheets

AIR BEARING SLIDER WITH RELIEVED TRAILING EDGE

This is a continuation of application Ser. No. 07/715,792, filed Jun. 14, 1991 now U.S. Pat. No. 5,182,689.

CROSS-REFERENCE TO COPENDING APPLICATION

Reference is hereby made to U.S. patent application Ser. No. 07/715,453 of Robert E. Chapin, entitled "Negative Pressure Air Bearing Slider with Relieved Rail Ends", filed on Jun. 14, 1991.

BACKGROUND OF THE INVENTION

The present invention relates to transducer head assemblies for rotating disc drives, and more particularly to air bearing disc head sliders.

Transducer head assemblies that "fly" relative to a rotating disc are used extensively in rotating disc drives. The assemblies include an air bearing slider for carrying a magnetic transducer proximate the rotating disc. A track accessing arm positions the slider over individual data tracks on the disc surface.

A gimbal is positioned between the slider and the track accessing arm to provide a resilient connection that allows the slider to follow the topography of the disc. The gimbal includes a dimple that is in point contact with the slider. The dimple provides a pivot about which the slider can pitch and roll while following the topography of the disc.

A conventional catamaran slider includes a pair of rails that are positioned along its edges and are disposed about a recessed area to form a pair of air bearing surfaces. As the disc rotates, the disc drags air under the slider and along the air bearing surfaces in a direction approximately parallel to the tangential velocity of the disc. As the air passes beneath the side rails, the skin friction on the air bearing surfaces causes the air pressure between the disc and the air bearing surfaces to increase which creates a hydrodynamic lifting force that causes the slider to lift and fly above the disc surface.

Negative pressure air bearing sliders (NPAB) further include a cross rail which extends between the side rails and is positioned near the slider's leading edge. The cross rail forms a subambient pressure region trailing the cross rail, between the side rails. The subambient pressure region develops negative pressure that counteracts the hydrodynamic lifting force developed along the side rails. The counter action between the positive and negative forces reduces flying height sensitivity with respect to disc velocity and increases air bearing stiffness.

As disc drives become more compact for applications in smaller and more portable equipment, rotary actuators are increasingly employed for the track accessing arm. Further, the designer is motivated to use a shorter actuator pivot arm to make the disc drives even more compact. Rotary actuators cause the geometric orientation between the disc rotation tangent and the slider's center line to change as the arm moves the slider between the inside and outside data tracks on the disc. This is known as skew or skew angle. Large skew angles make flying height control more difficult.

Flying height is viewed as one of the most critical parameters of noncontact recording. As the average flying height of the slider decreases, the transducer achieves greater resolution between individual data bit locations on the disc. Therefore, it is desirable to have the transducers fly as close to the disc as possible. Flying height is preferably uniform regardless of variable flying conditions, such as tangential velocity variation from inside to outside tracks, lateral slider movement during a seek, and varying skew angles.

In the past, the transducer has been positioned on the trailing end of the side rails. Because the slider flies with a pitch angle in which the leading edge flies at a greater distance than the trailing edge, the transducer is as close to the disc surface as possible when positioned at the trailing edge.

Transducers have also been mounted on a small mounting pad positioned on the center line of the slider at the trailing edge. In this position, there is more room on the trailing end of the slider for fabrication of the transducer and its terminals, relative to the position in which the transducer is mounted off to the side of the trailing end, adjacent the side rails. A disadvantage of central transducer mounting is that when the slider rolls about its pivot point, the spacing of a corner of the trailing edge becomes smaller than the spacing of the transducer. This reduces the minimum flying height of the slider and causes increased risk of slider contact with the disc surface.

Slider roll may be due to several factors. The first factor is manufacturing errors in the gimbal which attaches the slider to the track accessing arm. The second factor is dynamic forces applied to the air bearing slider by the track accessing arm during track accessing. The third factor is varying skew angles of the disc rotation tangent relative to the slider center line. When the slider flies at skew with respect to the direction of air flow, unequal pressure distribution develops between the first and second side rails. This causes the slider to fly with one rail closer to the disc surface than the other rail. As a result, the probability of contact with the disc surface at this corner increases. Therefore, the reliability of the disc drive is reduced. There is a continuing effort to develop air bearing sliders that carry a transducer as close to the disc surface as possible with a constant flying height regardless of the varying flying conditions such as disc velocity and skew angle.

SUMMARY OF THE INVENTION

The present invention is an air bearing disc head slider configured for supporting a transducer proximate a rotating disc. The slider includes a slider body having a leading edge, a trailing edge and first and second side edges. First and second raised side rails are positioned along the first and second side edges, respectively, to form a pair of air bearing surfaces. The first and second side rails each includes a trailing edge relief positioned adjacent the trailing edge. The trailing edge reliefs form surfaces which are recessed from the air bearing surfaces and are raised from the slider body. In one embodiment, the recessed surfaces have depths suitable for forming subambient pressure regions at the trailing edge.

The air bearing surfaces develop positive pressure as the disc rotates beneath them. The relieved trailing edges truncate the air bearing surfaces prior to the slider's trailing edge and create subambient pressure regions near the trailing edge. These subambient pressure regions "pull" the transducer mounting pad closer to the disc surface. The relieved trailing edges also shift the center of positive pressure forward along the first and second side rails toward the leading edge causing the slider to rotate (pitch) which forces the transducer even closer to the disc surface.

The relieved trailing edges reduce transducer flying height sensitivity to disc velocity. The tangential velocity of the rotating disc is greater at its outer diameter than at its inner diameter. As a result, the positive pressure along the first and second side rails is greater when the slider is positioned at the outer diameter which causes the slider to fly at a greater distance from the disc surface than when positioned at the inner diameter. However, the subambient pressure effects of the relieved trailing edges also increase with disc velocity and limit any increase in flying height. The negative pressure created near the trailing edge increases causing the slider to rotate the trailing edge even further toward the disc surface and substantially negate increases in flying height.

In one embodiment, the transducer is mounted on a mounting pad positioned on the slider body at the trailing edge, between the first and second side rails. In this embodiment, the relieved trailing edges also reduce risk of slider contact with the disc surface caused by slider roll about its center line. The trailing edges of the first and second side rails have substantially larger spacing from the disc surface than the transducer. This allows a relatively large roll angle without risking contact by the trailing edges.

The trailing edge reliefs of the present invention can be used in either catamaran-type air bearing sliders or self-loading, negative pressure-type air bearing sliders.

DETAILED DESCRIPTION OF THE PREFERRED EMBODIMENTS

Figure 1:
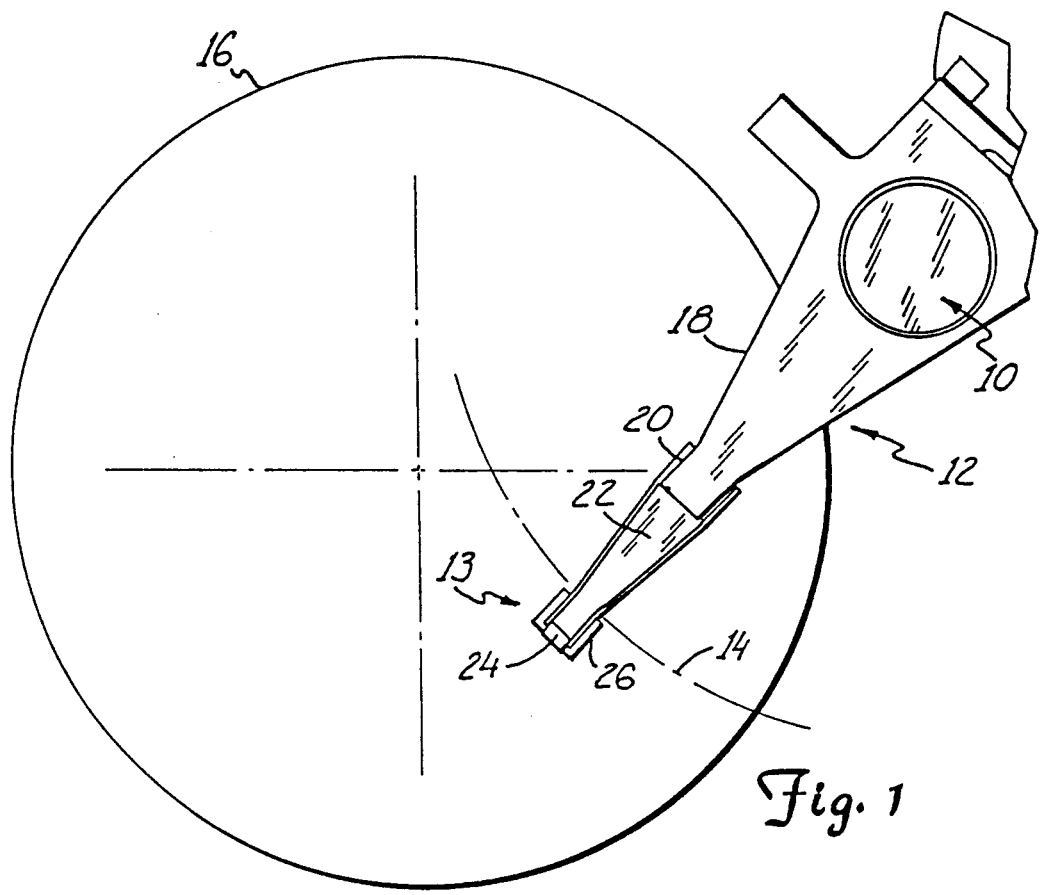
FIG. 1 is a top plan view of an air bearing disc head slider supported above a rotating disc.

The present invention is an air bearing disc head slider having first and second side rails with trailing edge reliefs. FIG. 1 is a top plan view of an air bearing disc head slider supported above a rotating disc. Actuator 10 and track accessing arm 12 support transducer head assembly 13 over disc 16 and move head assembly 13 along arc 14. Arm 12 includes supporting arm 18, base plate 20 and load beam 22. Transducer head assembly 13 includes gimbal spring 24 and air bearing disc head slider 26. Arm 12 is known as a rotary actuating arm because actuator 10 rotates arm 12 to position slider 26 over various data tracks (not shown) on the disc surface between an outer diameter and an inner diameter.

Figure 2:
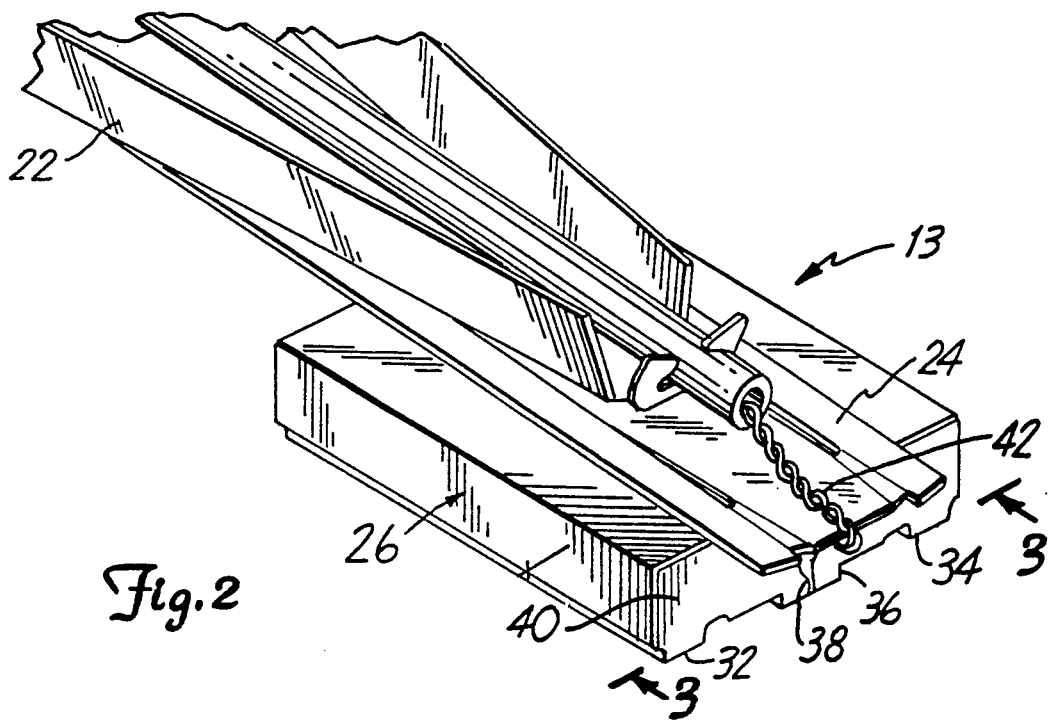
FIG. 2 is a perspective view of a transducer head assembly in accordance with the present invention.
Figure 3:
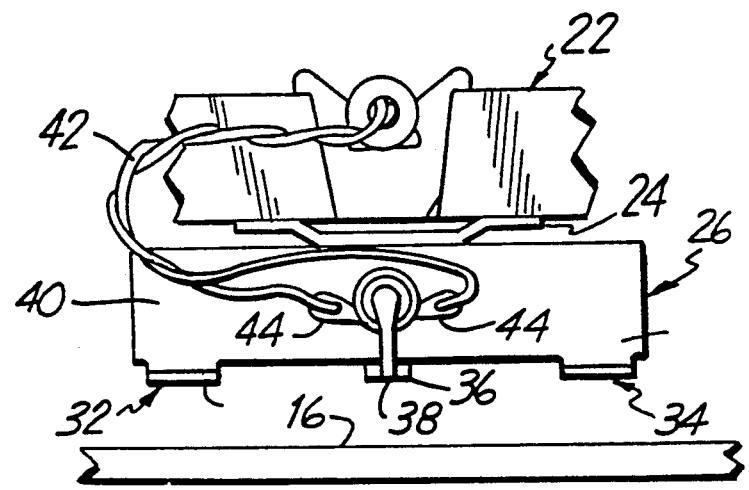
FIG. 3 is an end view of the transducer head assembly taken along line 3—3 of FIG. 2.

FIGS. 2 and 3 show transducer head assembly 13 in greater detail. FIG. 2 is a perspective view of transducer head assembly 13 supported by load beam 22. FIG. 3 is an end view of transducer head assembly 13 taken along line 3—3 of FIG. 2. Load beam 22 supplies a preload force which urges transducer head assembly 13 toward the disc surface. Assembly 13 includes gimbal spring 24 and slider 26. Gimbal spring 24 is positioned between slider 26 and load beam 22 to provide a resilient connection that allows the slider to follow the topography of the disc. Slider 26 is connected to gimbal spring 24 in a known manner, such as with an adhesive. Gimbal 24 includes a dimple (not shown) that is in point contact with slider 26. The dimple provides a pivot about which slider 26 can pitch and roll while following the topography of disc 16.

Slider 26 includes side rails 32, 34, transducer mounting pad 36, transducer 38, and trailing end 40. Transducer 38 is mounted to trailing end 40 and on transducer mounting pad 36. Transducer 38 is electrically coupled to leads 42 at terminals 44. Transducer 38 communicates with individual bit positions on the surface of disc 16 as they pass beneath slider 26.

Figure 4:
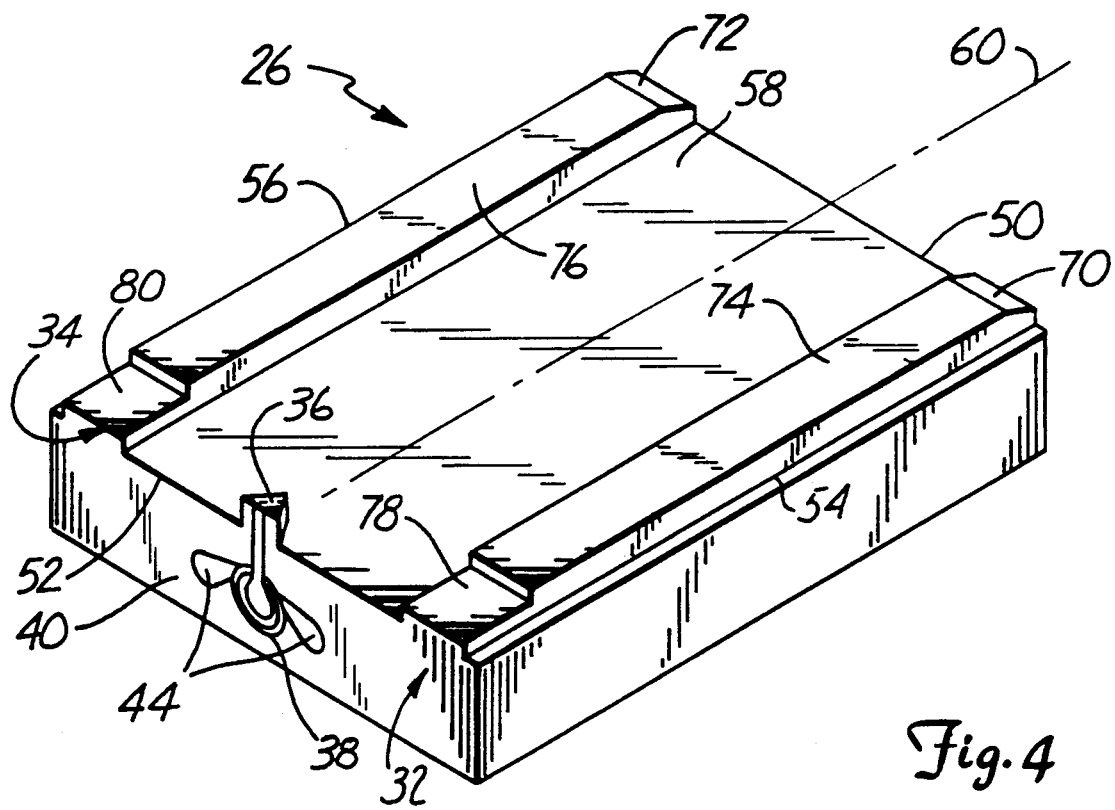
FIG. 4 is a perspective view of an air bearing disc head slider in accordance with the present invention, as viewed from a trailing edge.

FIG. 4 is a perspective view of slider 26, as viewed from trailing end 40. Slider 26 is a catamaran-type slider and includes first and second side rails 32, 34, transducer mounting pad 36, transducer 38, trailing end 40, leading edge 50, trailing edge 52 and first and second side edges 54, 56. First and second side rails 32, 34 are positioned along first and second side edges 54, 56, respectively, and extend between leading edge 50 and trailing edge 52. Side rails 32 and 34 form a recessed area 58 between the side rails.

Transducer mounting pad 36 is positioned at trailing edge 52, between first and second side rails 32 and 34. In the embodiment shown in FIG. 4, transducer mounting pad 36 is positioned along center line 60 of slider 26. Transducer 38 is mounted on trailing end 40 and on transducer mounting pad 36. The central position of transducer 38 on trailing end 40 allows more room on the trailing end for fabrication of the transducer and its terminals 44, relative to sliders on which the transducer is mounted adjacent side rails 32 and 34.

Side rails 32 and 34 include leading edge tapers 70 and 72, air bearing surfaces 74 and 76 and trailing edge reliefs 78 and 80, respectively. As disc 16 rotates, the disc drags air under slider 26 and along air bearing surfaces 74 and 76 in a direction generally parallel to the tangential velocity of the disc. As the air passes beneath side rails 32 and 34, the skin friction on air bearing surfaces 74 and 76 causes the air pressure between disc 16 and the air bearing surfaces to increase which creates a hydrodynamic lifting force that causes slider 26 to lift and to fly above the disc surface.

Recessed area 58 remains at substantially ambient pressure. Leading edge tapers 70 and 72 provide faster takeoff when the disc begins to rotate by scooping more air beneath rails 32 and 34 to increase the hydrodynamic lifting force at leading edge 50. Faster takeoff decreases the length of time slider 26 slides on the disc surface before it begins to fly and thereby decreases wear on both slider 26 and disc 16.

Air bearing surfaces 74 and 76 are coplanar with central mounting pad 36. Trailing edge reliefs 78 and 80 form surfaces which are recessed from the plane defined by air bearing surfaces 74, 76 and are raisd from the slider body in recessed area 58. Trailing edge reliefs 78 and 80 truncate air bearing surfaces 74 and 76 short of trailing edge 52. Trailing edge reliefs 78 and 80 have a depth which is sufficient to form subambient pressure regions adjacent trailing edge 52.

These subambient pressure regions "pull" transducer mounting pad 36 closer to the disc surface. Relieved trailing edges 78, 80 also shift the center of positive pressure forward along air bearing surfaces 74, 76 toward leading edge 50 causing slider 26 to rotate or "pitch" and force transducer mounting pad 36 even closer to the disc surface. When slider 26 flies with a positive pitch, leading edge 50 flies at a greater distance from the disc surface than trailing edge 52. Pitch angle is a measurement of the degree of positive pitch.

For example, the pitch angles of a conventional catamaran-type slider and a catamaran-type slider with relieved trailing edges were compared. Both versions had pivots positioned at the center of the slider body. The pitch angle was calculated at the inner radius of the disc. The width of the side rails for each slider were adjusted to give the transducer a flying height of 8.00 micro inches. The resulting pitch angles were 177 micro radians for the conventional slider, and 438 micro radians for the slider with relieved trailing edges.

In one embodiment in which slider 26 is 80 mils long and 60 mils wide and load beam 22 supplies a preload force of 3.5 grams, trailing edge reliefs 78 and 80 have a depth of 4.0 micro inches (about 1.00 microns). However, the depth can range from approximately 20 to 200 micro inches (about 0.5 to 5.0 microns). Trailing edge reliefs 78 and 80 extend from trailing edge 52 toward leading edge 50 a distance of about 10 mils. This distance can range from approximately 1/12th to ¼th of the length of slider 26, as measured from leading edge 50 to trailing edge 52. Leading edge tapers 70 and 72 are approximately 10 mils long, and have an 8.00 milliradian angle with respect to air bearing surfaces 74 and 76.

Figure 5:
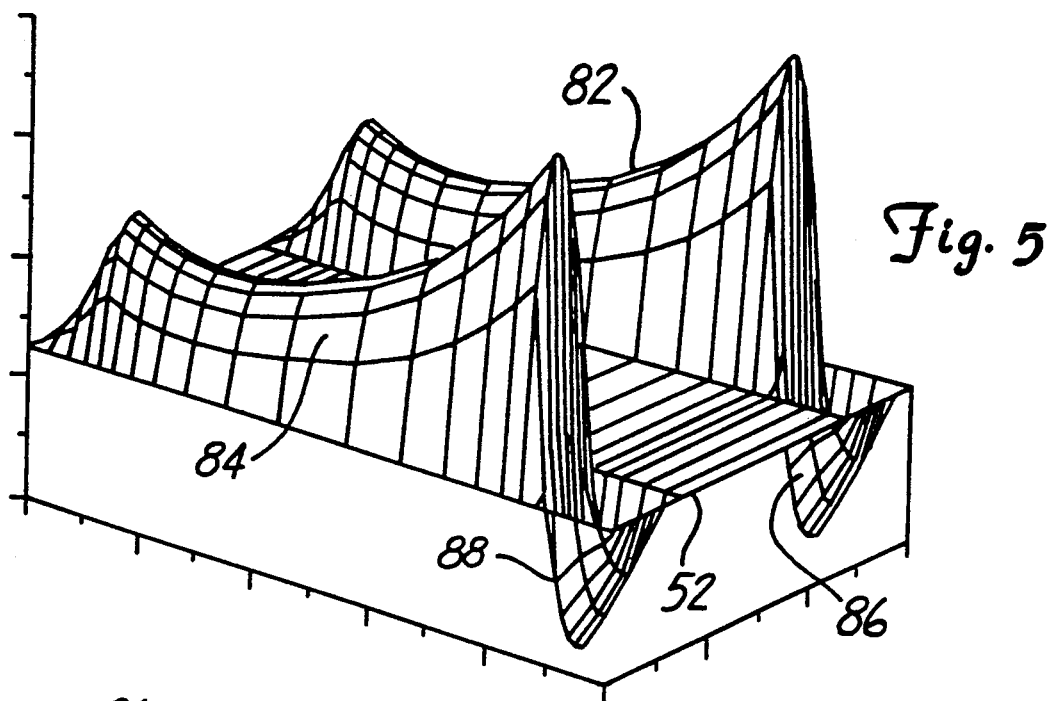
FIG. 5 is a graph of the pressure profile for the air bearing disc head slider shown in FIG. 4.

FIG. 5 is a graph of the pressure profile for catamaran-type slider 26 shown in FIG. 4. Side rail 32 develops positive pressure 82 along air bearing surface 74. Similarly, side rail 34 develops positive pressure 84 along air bearing surface 76. Trailing edge reliefs 78 and 80 create subambient pressure regions 86 and 88, respectively, near trailing edge 52 of slider 26.

Figure 6A:
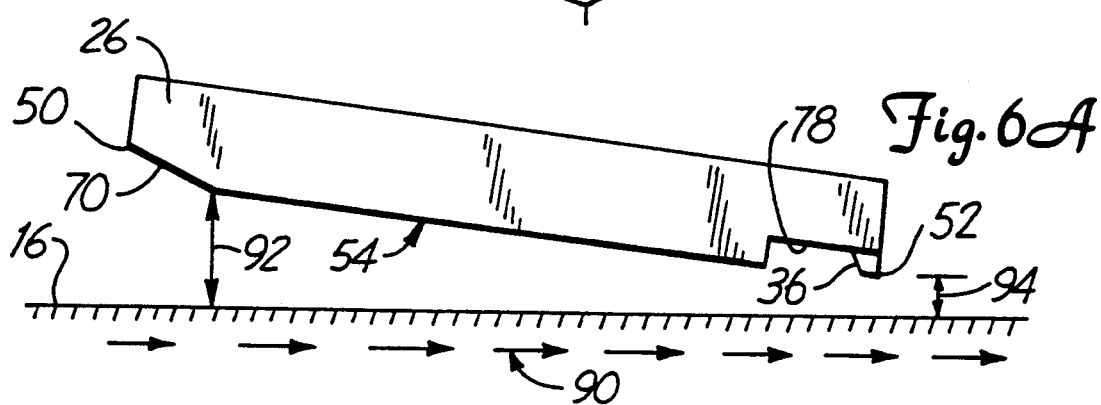
FIG. 6a is a side plan view of the air bearing disc head slider shown in FIG. 1 in a pitched position at an inner radius of the rotating disc.
Figure 6B:
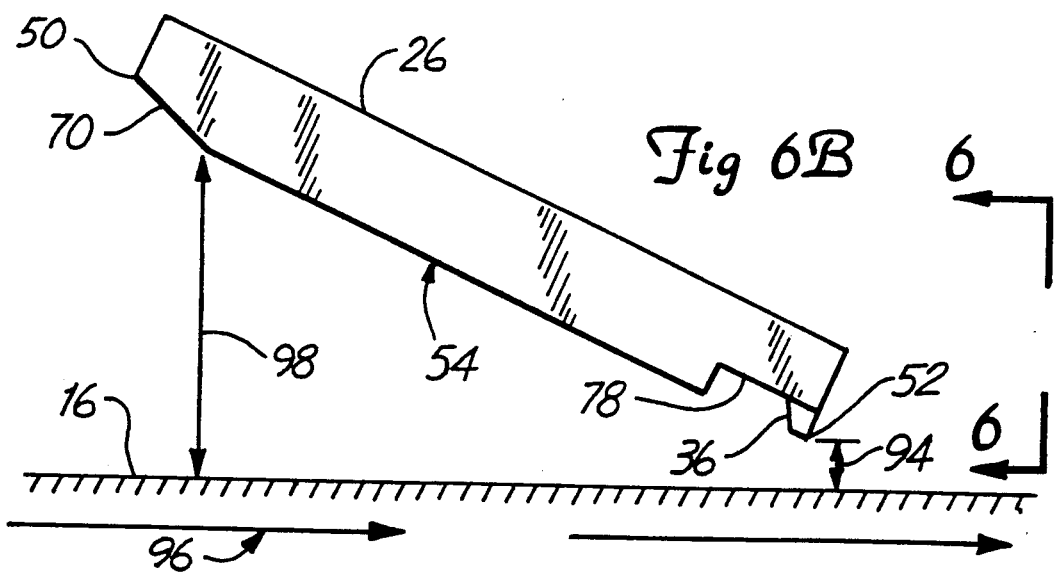
FIG. 6b is a side plan view of the air bearing disc head slider shown in FIG. 1 in a pitched position at an outer radius of the rotating disc.

FIGS. 6a and 6b are side views of slider 26 flying above the surface of disc 16. In FIG. 5a, slider 26 is positioned at the inner diameter of disc 16. The length and direction of arrows 90 are representative of the tangential velocity of disc 16 at the inner diameter. Slider 26 flies with a pitch angle such that leading edge 50 flies at a greater distance from the disc surface than does trailing edge 52. Leading edge 50 flies at distance 92 from the disc surface while trailing edge 52 flies at distance 94 from the disc surface.

Because trailing edge reliefs 78 and 80 (relief 80 not shown) are recessed, the spacing between transducer mounting pad 36 and the disc surface is the smallest spacing of any point on the slider body. This provides the greatest resolution between individual bit positions on the disc surface without risking contact with the disc surface by other portions of the slider body.

In FIG. 6b, slider 26 is positioned at the outer diameter of disc 16. The length and direction of arrows 96 are representative of the tangential velocity of disc 16 at its outer diameter. The tangential velocity of disc 16 is greater at its outer diameter than at its inner diameter. As a result, positive pressure along air bearing surfaces 54 and 56 (56 not shown) is greater when slider 26 is positioned at the outer diameter which causes the slider to fly at a greater distance from the disc surface than when positioned at the inner diameter. However, the subambient pressure effects of relieved trailing edges 78 and 80 (80 not shown) also increase with disc velocity and limit any increase in flying height. The increased subambiant pressure created near trailing edge 52 causes slider 26 to rotate the trailing edge even further toward the disc surface and substantially negate increases in flying height. As shown in FIG. 5b, leading edge 50 flies at a greater distance 98 at the outer diameter than the distance 92 at the inner diameter (shown in FIG. 5a). However, trailing edge 54 remains at distance 94 from the disc surface. Therefore, trailing edge reliefs 78 and 80 reduce transducer flying height sensitivity to disc velocity.

Figure 7:
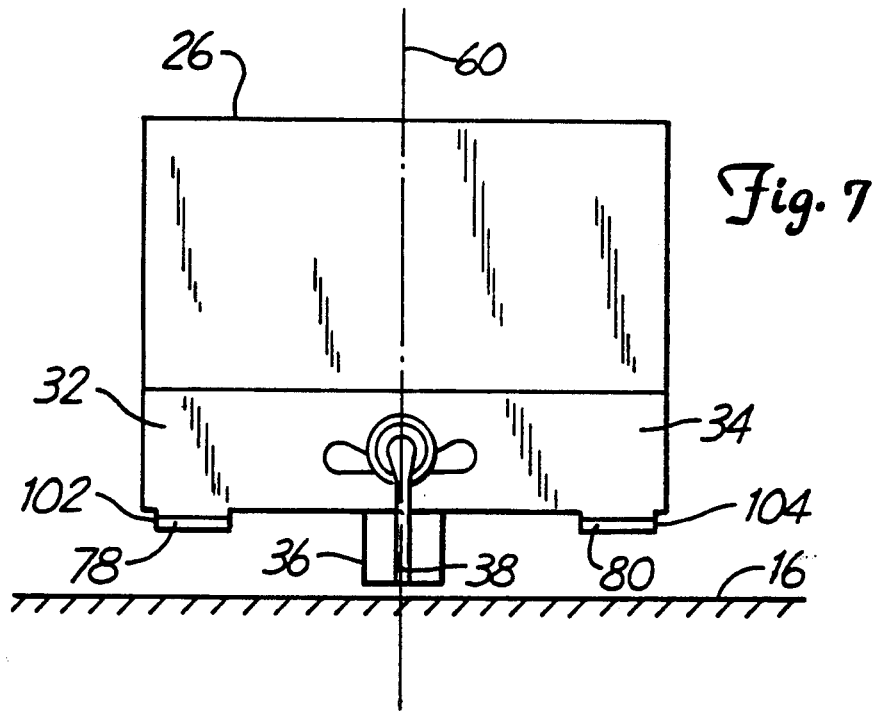
FIG. 7 is a trailing end view of the air bearing disc head slider shown in FIG. 1 in a pitched position over the disc surface.

FIG. 7 is an end view of slider 26 as viewed from line 6—6 of FIG. 6b. Slider 26 includes rails 32 and 34, transducer mounting pad 36, transducer 38 and trailing edge reliefs 78 and 80. Relieved trailing edges 78, 80 reduce risk of slider contact with the disc surface caused by slider roll about its center line 60. When slider 26 flies at skew with respect to the direction of air flow, unequal pressure distribution develops between side rails 32 and 34. This causes slider 26 to fly with one rail closer to the disc surface than the other rail.

Side rails 32 and 34 include trailing edges 102 and 104, respectively. Trailing edges 102 and 104 have substantially larger spacing from the disc surface than transducer mounting pad 36. This allows a relatively large roll angle without risking contact by trailing edges 102 and 104.

Figure 8:
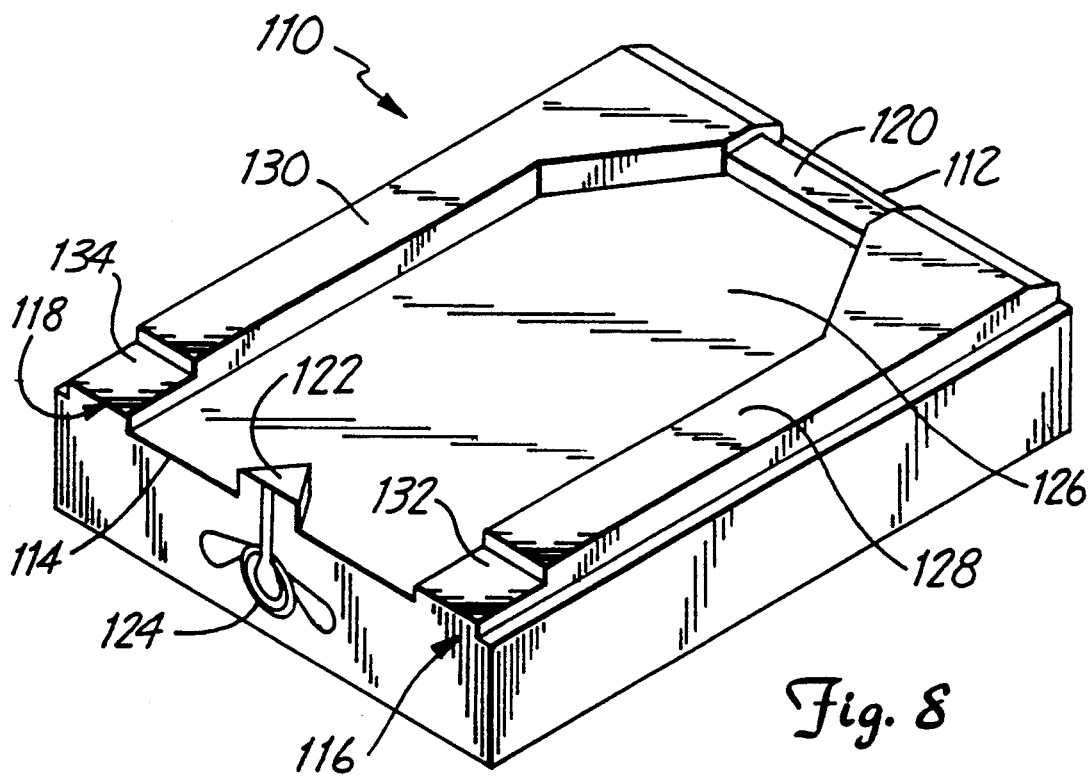
FIG. 8 is a perspective view of a self-loading, negative pressure air bearing slider in a accordance with the present invention, as viewed from a trailing edge.

FIG. 8 is a perspective view of a self-loading, negative pressure air bearing slider (NPAB) in accordance with the present invention. NPAB slider 110 includes leading edge 112, trailing edge 114, side rails 116 and 118, cross rail 120, transducer mounting pad 122 and transducer 124. Cross rail 120 extends between side rails 116 and 118 and is positioned closer to leading edge 112 than to trailing edge 114. Cross rail 120 creates a subambient pressure region 126 trailing the cross rail, between side rails 116 and 118. Subambient pressure region 126 develops negative pressure that counteracts positive pressure along air bearing surfaces 128 and 130 of side rails 116 and 118, respectively. The counter action between the positive and negative forces reduces the sensitivity of slider flying height to disc velocity and increases slider stiffness.

Side rails 116 and 118 include trailing edge reliefs 132 and 134 that truncate air bearing surfaces 128 and 130, respectively, prior to trailing edge 114. Trailing edge reliefs 132 and 134 create subambient pressure regions near trailing edge 114. These subambient pressure regions "pull" transducer mounting pad 122 closer to the disc surface. Trailing edge reliefs 132 and 134 on NPAB slider 110 provide similar flying characteristic advantages that trailing edge reliefs 78 and 80 provide the catamaran-type slider 26 shown in FIGS. 1-6.

Slider 110 also includes an alternative rail configuration. Side rails 116 and 118 are wider at leading edge 112 than at trailing edge 114. This causes the variation of pitch angle with sliding velocity to increase, thereby causing the degree of rotation of transducer mounting pad 122 toward the disc surface to increase.

Conventional sliders and the sliders with relieved trailing edges (RTE sliders) were compared by computer simulation analyses for sensitivity of transducer clearance, pitch angle, close point and stiffness over a velocity range of 200 in/s to 1800 in/s. It is well known that large clearances and pitch angles reduce the stiffness of the air bearing. Therefore, in order to better compare the RTE sliders to the conventional sliders, the pivot point was moved forward on the RTE designs. The rail widths were also adjusted so that there was a point near the center of the velocity range where the sliders had the same transducer clearance and pitch angle.

Figure 9A:
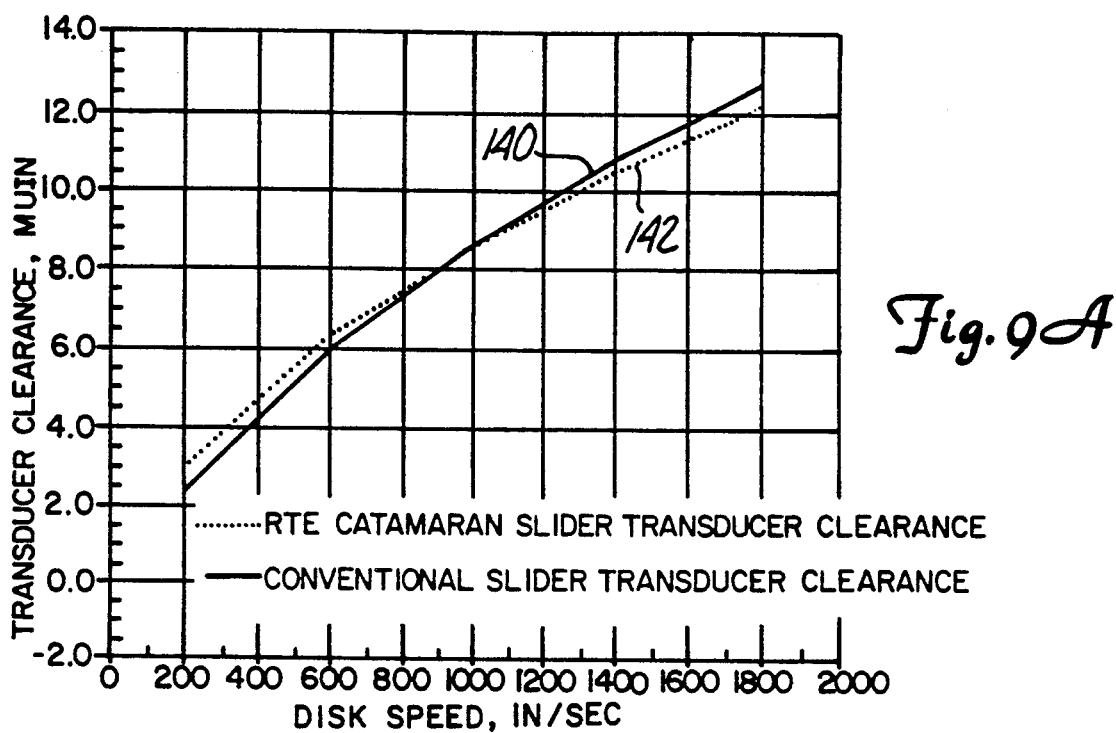
FIGS. 9a and 9b are graphs which illustrate transducer clearance sensitivity to disc velocity.
Figure 9B:
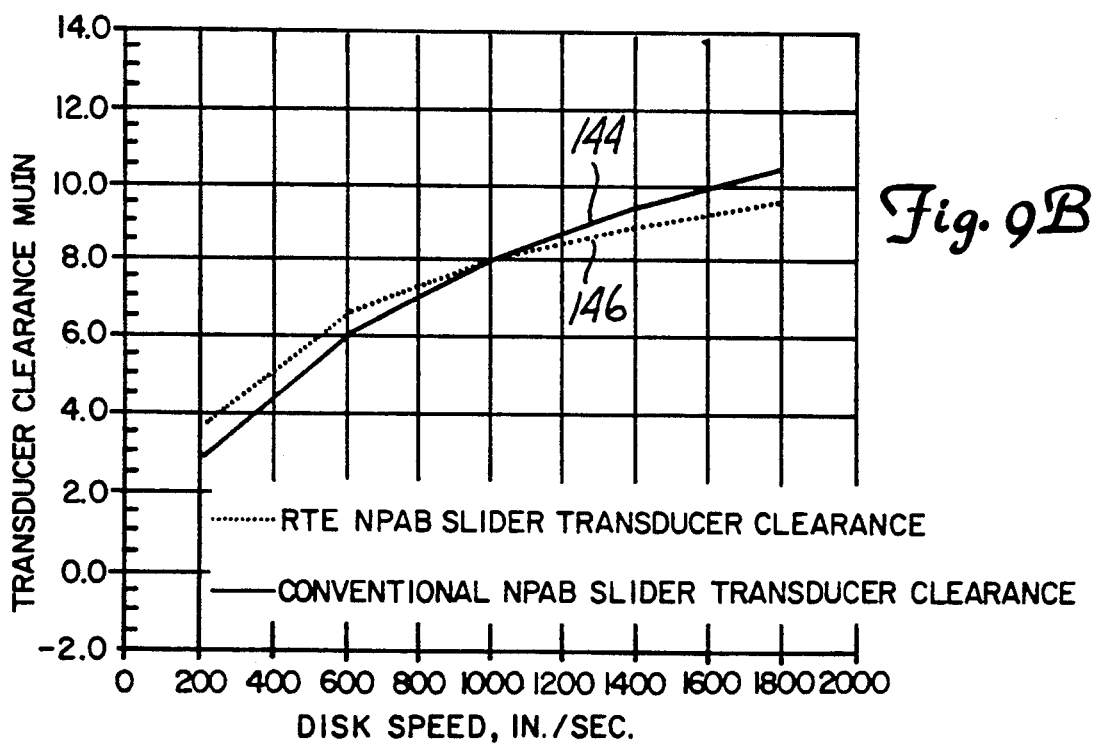

FIGS. 9a and 9b are graphs which illustrate transducer clearance (flying height) sensitivity to disc velocity. FIG. 9a compares transducer clearance for a conventional catamaran slider and an RTE slider. Solid line 140 represents the transducer clearance for the conventional catamaran slider. Dashed line 142 represents the transducer clearance for the RTE catamaran slider. FIG. 9b compares transducer clearance for the conventional NPAB slider and the RTE NPAB slider. Solid line 144 represents the conventional NPAB slider transducer clearance. Dashed line 146 represents the RTE NPAB slider transducer clearance. FIGS. 9a and 9b show that the transducer clearance of the RTE slider is less sensitive to disc velocity than the conventional slider. This is due to two effects. First, the subambient pressurization of the relieved trailing edges increases with disc velocity, tending to hold the transducer down. Second, the subambient pressurization of the relieved trailing edges increases the sensitivity of pitch angle to velocity. The larger pitch angle at high velocity tends to rotate the transducer toward the disc surface and limit increases in transducer flying height.

Figure 10:
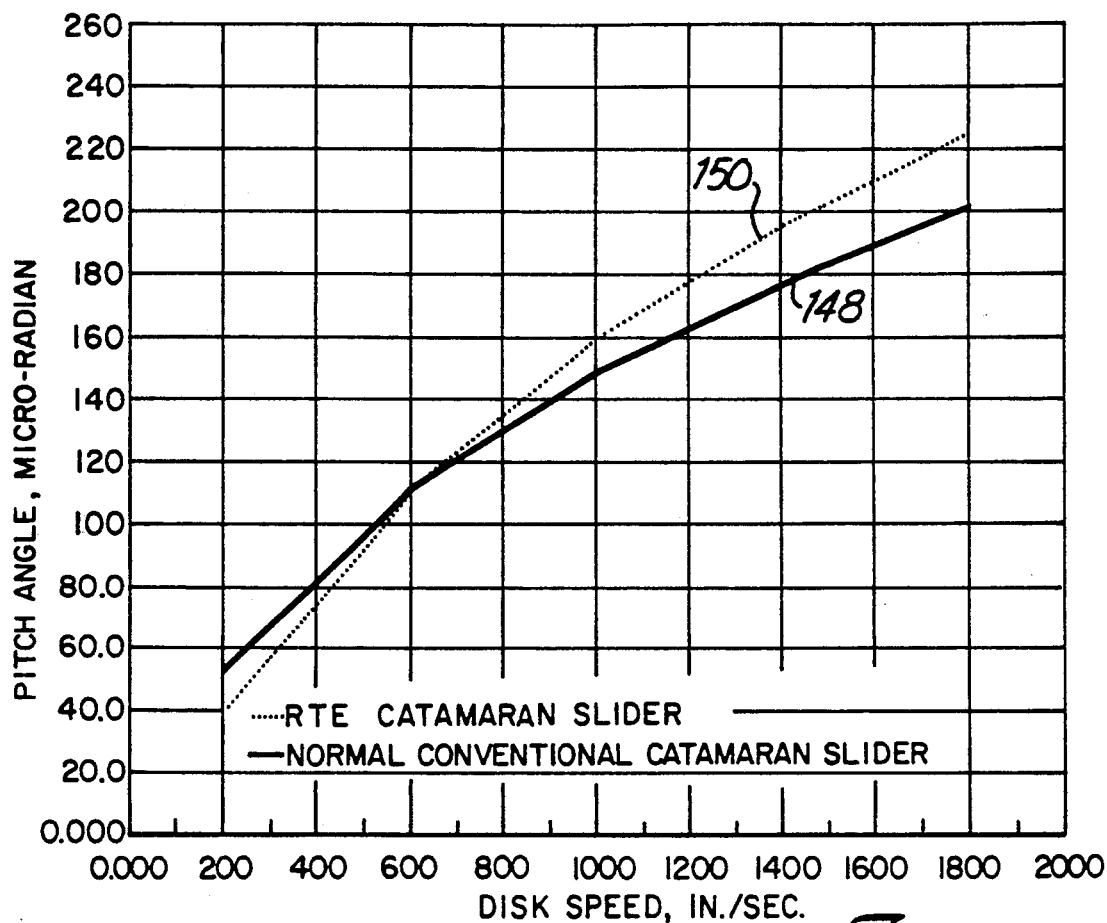
FIG. 10 is a graph which compares pitch angle sensitivity to disc velocity for a conventional catamaran slider and an RTE catamaran slider of the present invention.

FIG. 10 is a graph which compares pitch angle sensitivity to velocity between the conventional catamaran slider and the RTE catamaran slider. Solid line 148 represents the pitch angle for the conventional catamaran slider. Dashed line 150 represents the pitch angle for the RTE catamaran slider. As discussed with reference to FIGS. 9a and 9b, the relieved trailing edges increase the sensitivity of pitch angle to disc velocity.

Figure 11A:
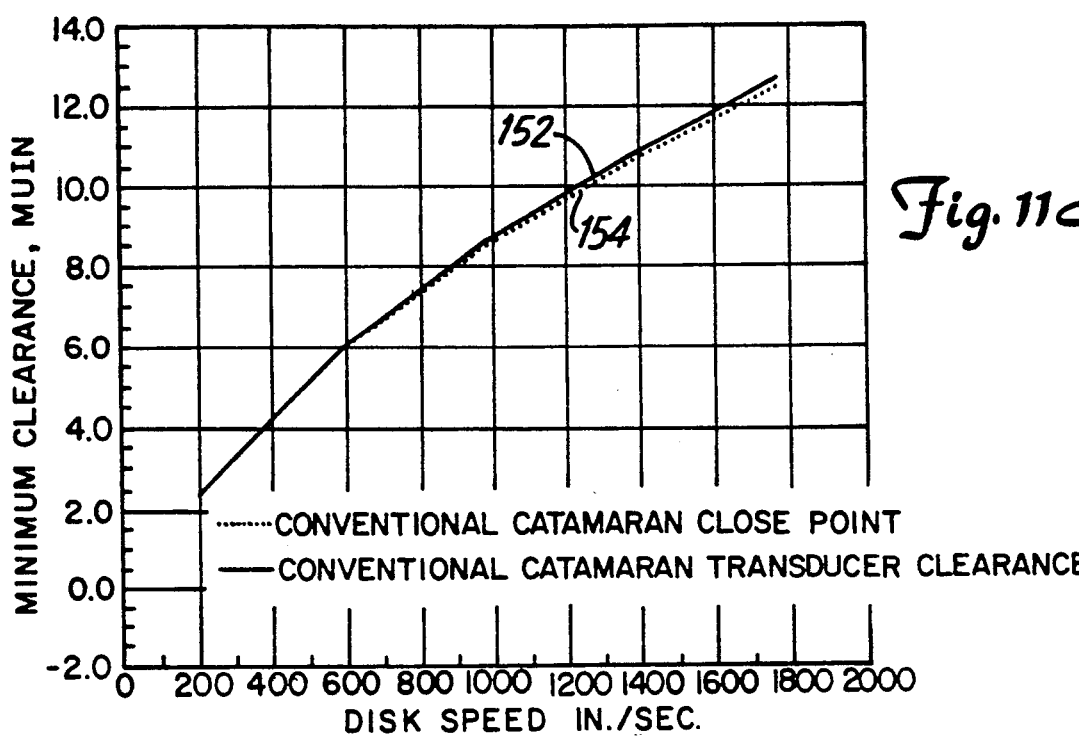
FIGS. 11a and 11b are graphs which illustrate close point variations between a transducer and a slider body.
Figure 11B:
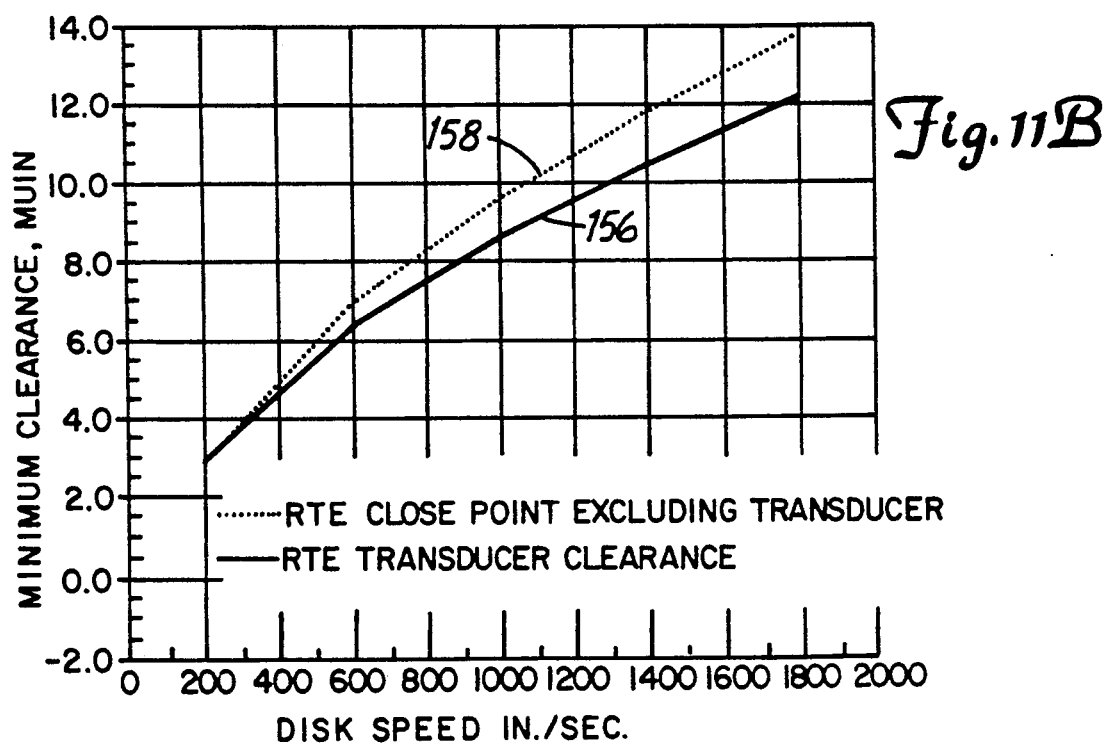

FIGS. 11a and 11b are graphs which illustrate close point variations between the slider body and the transducer. Preferably the transducer remains the closest point to the disc surface with respect to any other point on the slider body. This maximizes transducer resolution between individual bit positions on the disc surface and allows a relatively large roll angle without risking contact with the disc by other points on the slider body.

FIG. 11a illustrates the clearance variations for a conventional catamaran slider with respect to disc velocity. Solid line 152 represents the clearance or "close point" of the transducer. Dashed line 154 represents the close point of the slider body, excluding the transducer. FIG. 11b illustrates the clearance variations for the RTE catamaran slider. Solid line 156 represents the RTE transducer clearance. Dashed line 158 represents the close point of the RTE slider body, excluding the transducer.

As shown in FIG. 11b, the effect of the relieved trailing edges provides a maximum margin of 1.6 micro inches between the transducer and the rest of the slider body at a disc speed of 1800 in/s. This maximum margin would allow the slider to roll within a 53 micro radian range before the spacing of the outer trailing edge became less than the transducer spacing. The spacing margin is negative at 200 in/s sliding velocity, due to the effect of crown height at low pitch angles where the center of the slider flies with a lower clearance than the transducer (crown height is the measure of "roundness" of the air bearing surface).

Figure 12C:
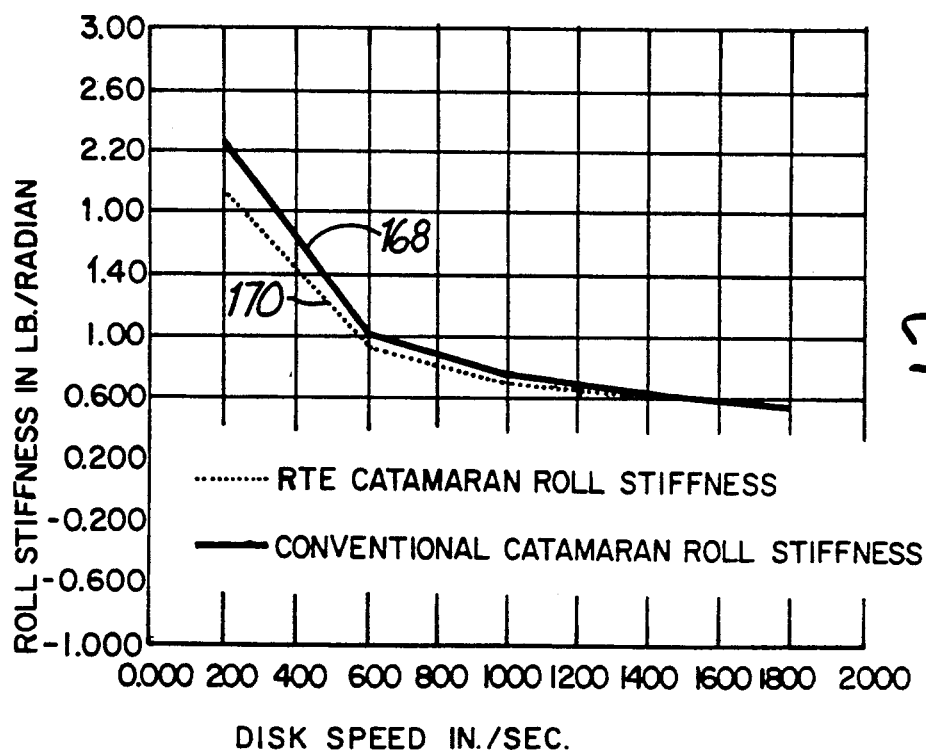
FIG. 12c is a graph which illustrates air bearing roll stiffness with respect to disc velocity.
Figure 12A:
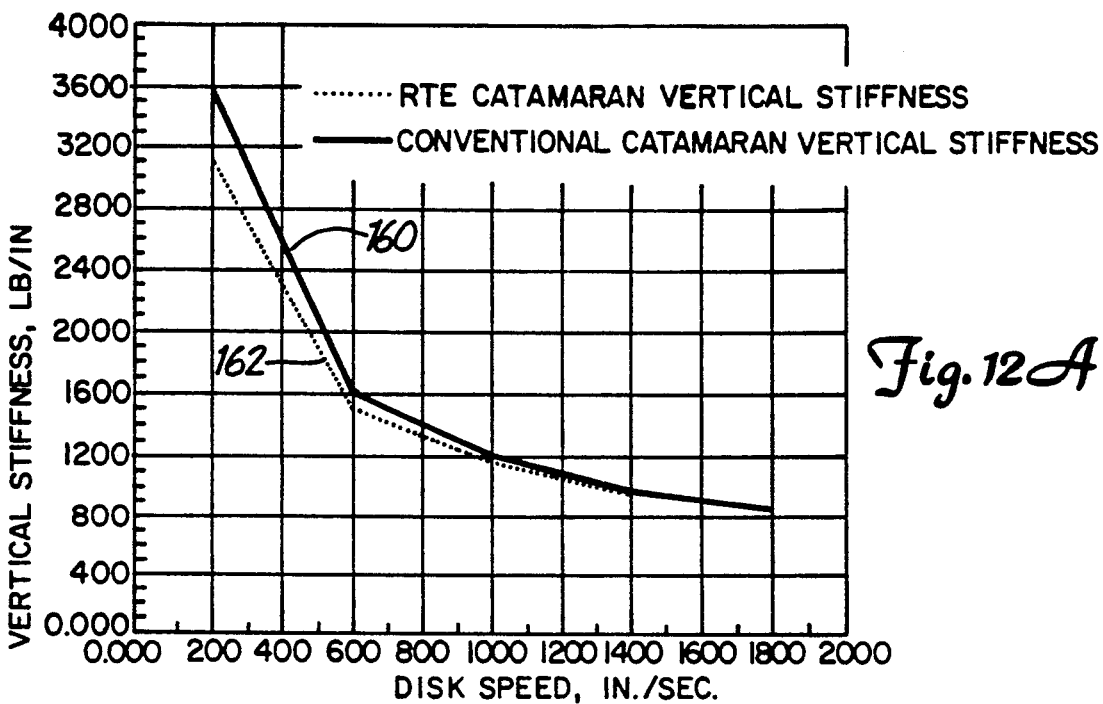
FIG. 12a is a graph which illustrates air bearing vertical stiffness with respect to disc velocity.
Figure 12B:
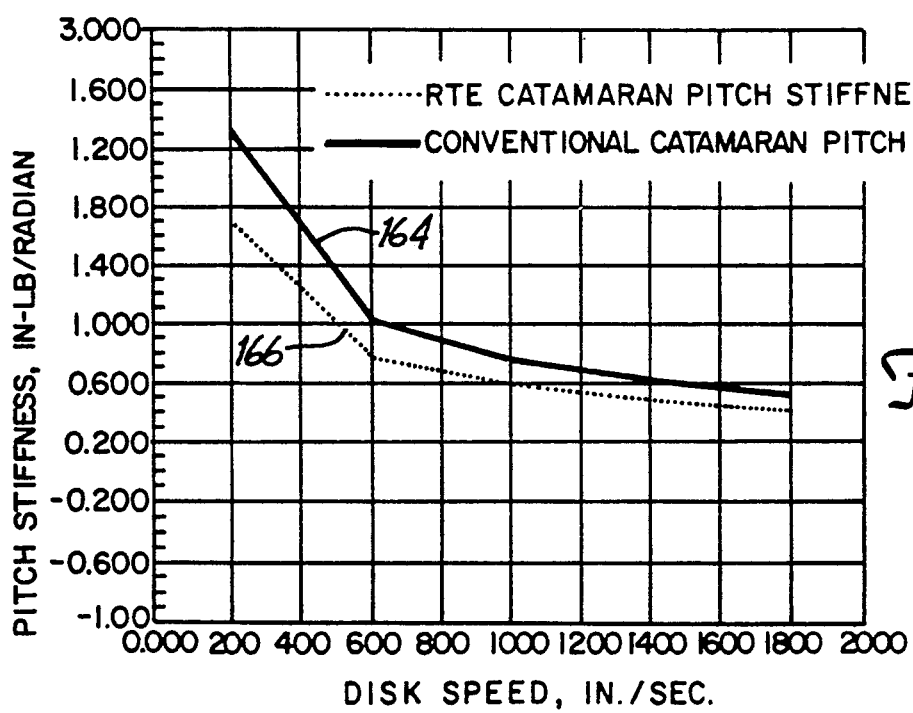
FIG. 12b is a graph which illustrates air bearing pitch stiffness with respect to disc velocity.

FIGS. 12a, 12b and 12c are graphs which illustrate various air bearing stiffnesses with respect to disc velocity for the conventional catamaran slider and the RTE catamaran slider. FIG. 12a illustrates air bearing vertical stiffness with respect to velocity. Solid line 160 represents the conventional catamaran vertical stiffness. Dashed line 162 represents the RTE catamaran vertical stiffness.

FIG. 12b illustrates air bearing pitch stiffness with respect to velocity. Solid line 164 represents the conventional catamaran pitch stiffness. Dashed line 166 represents the RTE catamaran pitch stiffness. FIG. 12c illustrates air bearing roll stiffness with respect to velocity. Solid line 168 represents the conventional catamaran roll stiffness. Dashed line 170 represents the RTE catamaran roll stiffness. FIGS. 12a, 12b and 12c show that the RTE catamaran stiffness is generally lower than the conventional catamaran stiffness for the above categories. The air bearing stiffness is decreased because the clearances of the air bearing surfaces are generally higher due to the reliefs at the traditionally low clearance areas near the trailing edge. Pitch stiffness is further reduced by the truncated air bearing length, which offers a shorter lever arm for pressure responses to act upon.

The net downward forces on the slider due to subambient pressurization are shown below in Table I. The downward forces on the relieved trailing edges are shown under the RTE catamaran column. These forces are rather small compared to the preload force of 3.5 gm and the conventional NPAB downward force.

TABLE I

| SUBAMBIENT FORCES VS VELOCITY, GMF | | | |
|---|---|---|---|
| VELOCITY, IN/S | RTE CATAMARAN | CONVENTIONAL NPAB | RTE NPAB |
| 200 | 0.12 | 0.97 | 1.09 |
| 600 | 0.21 | 2.58 | 2.75 |
| 1000 | 0.25 | 3.90 | 4.04 |
| 1400 | 0.26 | 4.93 | 5.03 |
| 1800 | 0.27 | 5.70 | 5.78 |

Although the present invention has been described with reference to preferred embodiments, workers skilled in the art will recognize that changes may be made in form and detail without departing from the spirit and scope of the invention. For example, the trailing edge reliefs are not limited to use with catamaran-type or NPAB-type air bearing surfaces, but may be used with virtually any air bearing surface configuration.

What is claimed is:

1. A slider configured for supporting a transducer proximate a rotating disc, the slider comprising:
   a slider body having a surface with a leading edge, a trailing edge and first and second side edges;
   a first side rail extending along the first side edge and having an inner edge and an outer edge, the first side rail having a first air bearing surface which is raised from the slider body surface;
   a second side rail extending along the second side edge and having an inner edge and an outer edge, the second side rail having a second air bearing surface which is raised from the slider body surface;
   a first relieved trailing edge surface positioned within the first side rail and adjacent the trailing edge, the first relieved trailing edge surface extending from the inner edge of the first side rail to the outer edge of the first side rail, the first relieved trailing edge surface being recessed from the first air bearing surface by a depth of approximately 0.5 to 5.0 microns and being raised from the slider body surface;
   a second relieved trailing edge surface positioned within the second side rail and adjacent the trailing edge, the second relieved trailing edge surface extending from the inner edge of the second side rail to the outer edge of the second side rail, the second relieved trailing edge surface being recessed from the second air bearing surface by a depth of approximately 0.5 to 5.0 microns and being raised from the slider body surface; and
   wherein the transducer is mounted to the trailing edge of the slider body.

2. The slider of claim 1 wherein the depths of the first and second relieved trailing edge surfaces are suitable for forming subambient pressure regions at the trailing edge.

3. The slider of claim 1 wherein the depths of the first and second relieved trailing edge surfaces are approximately 1.0 micron.

4. A slider configured for supporting a transducer proximate a rotating disc, the slider comprising:
   a slider body having a surface with a leading edge, a trailing edge and first and second side edges;
   a first side rail extending along the first side edge and having an inner edge and an outer edge, the first side rail having a first air bearing surface which is raised from the slider body surface;
   a second side rail extending along the second side edge and having an inner edge and an outer edge, the second side rail having a second air bearing surface which is raised from the slider body surface;
   a first relieved trailing edge surface positioned within the first side rail and adjacent the trailing edge, the first relieved trailing edge surface extending from the inner edge of the first side rail to the outer edge of the first side rail, the first relieved trailing edge surface being recessed from the first air bearing surface and raised from the slider body surface;
   a second relieved trailing edge surface positioned within the second side rail and adjacent the trailing edge, the second relieved trailing edge surface extending from the inner edge of the second side rail to the outer edge of the second side rail, the second relieved trailing edge surface being recessed from the second air bearing surface and raised from the slider body surface;
   wherein the first and second relieved trailing edge surfaces extend from the trailing edge toward the leading edge for a distance that is approximately 1/12 to ¼ of a length of the slider, as measured from the leading edge to the trailing edge; and
   wherein the transducer is mounted to the trailing edge of the slider body.

5. A slider configured for supporting a transducer proximate a rotating disc, the slider comprising:
   a slider body having a surface with a leading edge, a trailing edge and first and second side edges;
   a first side rail extending along the first side edge and having an inner edge and an outer edge, the first side rail having a first air bearing surface which is raised from the slider body surface;
   a second side rail extending along the second side edge and having an inner edge and an outer edge, the second side rail having a second air bearing surface which is raised from the slider body surface;
   wherein the first and second side rails are each wider at the leading edge than at the trailing edge;
   a first relieved trailing edge surface positioned within the first side rail and adjacent the trailing edge, the first relieved trailing edge surface extending from the inner edge of the first side rail to the outer edge of the first side rail, the first relieved trailing edge surface being recessed from the first air bearing surface and raised from the slider body surface;
   a second relieved trailing edge surface positioned within the second side rail and adjacent the trailing edge, the second relieved trailing edge surface extending from the inner edge of the second side rail to the outer edge of the second side rail, the second relieved trailing edge surface being recessed from the second air bearing surface and raised from the slider body surface; and
   wherein the transducer is mounted to the trailing edge of the slider body.

6. The slider of claim 5 wherein the first and second side rails each further include a leading edge taper.

7. A slider configured for supporting a transducer proximate a rotating disc, the slider comprising:
   a slider body having a surface with a leading edge, a trailing edge and first and second side edges;
   a first side rail extending along the first side edge and having an inner edge and an outer edge, the first side rail having a first air bearing surface which is raised from the slider body surface;
   a second side rail extending along the second side edge and having an inner edge and an outer edge, the second side rail having a second air bearing surface which is raised from the slider body surface;
   a cross rail extending between the first and second side rails and positioned closer to the leading edge than to the trailing edge, the cross rail forming a subambient pressure region which extends from the cross rail to the trailing edge, between the first and second side rails;
   a first relieved trailing edge surface positioned within the first side rail and adjacent the trailing edge, the first relieved trailing edge surface extending from the inner edge of the first side rail to the outer edge of the first side rail, the first relieved trailing edge surface being recessed from the first air bearing surface and raised from the slider body surface;

a second relieved trailing edge surface positioned within the second side rail and adjacent the trailing edge, the second relieved trailing edge surface extending from the inner edge of the second side rail to the outer edge of the second side rail, the second relieved trailing edge surface being recessed from the second air bearing surface and raised from the slider body surface; and wherein the transducer is mounted to the trailing edge of the slider body.

8. A slider configured for supporting a transducer proximate a rotating disc, the slider comprising:

a slider body having a surface with a leading edge, a trailing edge and first and second side edges;

a first side rail extending along the first side edge and having an inner edge and an outer edge, the first side rail having a first air bearing surface which is raised from the slider body surface;

a second side rail extending along the second side edge and having an inner edge and an outer edge, the second side rail having a second air bearing surface which is raised from the slider body surface;

a first relieved trailing edge surface positioned within the first side rail and adjacent the trailing edge, the first relieved trailing edge surface extending from the inner edge of the first side rail to the outer edge of the first side rail, the first relieved trailing edge surface being recessed from the first air bearing surface and raised from the slider body surface;

a second relieved trailing edge surface positioned within the second side rail and adjacent the trailing edge, the second relieved trailing edge surface extending from the inner edge of the second side rail to the outer edge of the second side rail, the second relieved trailing edge surface being recessed from the second air bearing surface and raised from the slider body surface;

a transducer mounting pad positioned on the slider body surface between the side rails, the pad having a trailing edge surface which is raised from the slider body surface and the first and second relieved trailing edge surfaces; and wherein the transducer is mounted along the trailing edge surface of the transducer mounting pad.

9. The slider of claim 8 wherein the transducer mounting pad extends from the trailing edge toward the leading edge by a distance substantially less than a length of the slider.

10. The slider of claim 8 wherein the trailing edge surface of the transducer mounting pad lies within a plane defined by the air bearing surfaces.

* * * * *

UNITED STATES PATENT AND TRADEMARK OFFICE
CERTIFICATE OF CORRECTION

PATENT NO. : 5,267,109

DATED : November 30, 1993

INVENTOR(S) : ROBERT E. CHAPIN, PETER CRANE

It is certified that error appears in the above-identified patent and that said Letters Patent is hereby corrected as shown below:

Col. 1, line 41, delete "surf aces", insert --surfaces--

Col. 2, line 38, delete "surf ace", insert --surface--

Col. 5, line 48, delete "4.0 micro", insert --40 micro--

Signed and Sealed this

Tenth Day of May, 1994

*Attest:*

BRUCE LEHMAN

*Attesting Officer*     *Commissioner of Patents and Trademarks*